(12) United States Patent
Tarchinski

(10) Patent No.: US 7,786,386 B2
(45) Date of Patent: Aug. 31, 2010

(54) HIGH-VOLTAGE VEHICLE COMPONENT CONNECTION METHOD AND APPARATUS

(75) Inventor: James E. Tarchinski, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 331 days.

(21) Appl. No.: 12/102,921

(22) Filed: Apr. 15, 2008

(65) Prior Publication Data

US 2009/0255727 A1  Oct. 15, 2009

(51) Int. Cl.
*H01B 12/00* (2006.01)
(52) U.S. Cl. .................................... 174/125.1
(58) Field of Classification Search ............... 174/125.1, 174/126.1, 128.1, 15.1, 15.2, 15.5, 15.7
See application file for complete search history.

(56) References Cited

U.S. PATENT DOCUMENTS

| | | | | |
|---|---|---|---|---|
| 5,600,095 A | * | 2/1997 | Dew et al. | 174/84 R |
| 6,583,351 B1 | * | 6/2003 | Artman | 174/15.5 |
| 7,265,297 B2 | * | 9/2007 | Ashibe et al. | 174/125.1 |
| 7,608,785 B2 | * | 10/2009 | Reis | 174/125.1 |

\* cited by examiner

*Primary Examiner*—William H Mayo, III
(74) *Attorney, Agent, or Firm*—Quinn Law Group, PLLC

(57) ABSTRACT

A method and apparatus provide an electrical splice between different high-voltage components in a high-voltage propelled vehicle (HVPV), which enables a daisy-chain or series connection of the components. The method includes connecting a first end of a cable to a first component, a second end of the cable to a high-voltage bus bar within a second component to form a splice, and using the outer housings of the components to provide an environmental seal and electromagnetic capability (EMC) shield for the splice, rather than providing such a splice within a dedicated or shared power distribution box. A ring terminal connects to an end of a cable by a press-fitting process or a soldering process. The components can be an energy storage system (ESS), a power inverter module (PIM), an air conditioning control module (ACCM), an auxiliary power module (APM), a power steering controller, and an electrical motor/generator.

14 Claims, 2 Drawing Sheets

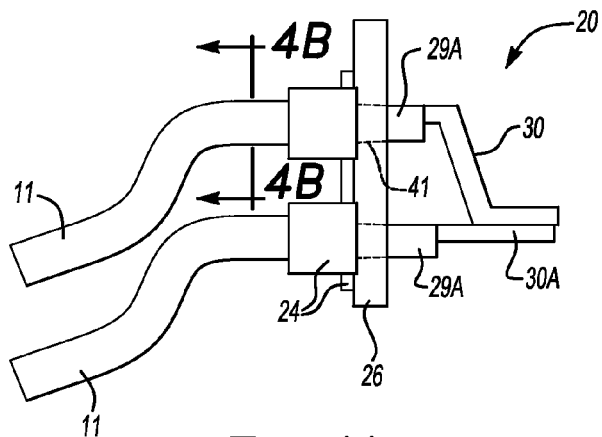
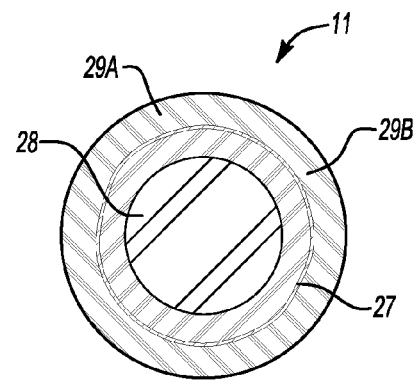
Fig-4A
Fig-4B
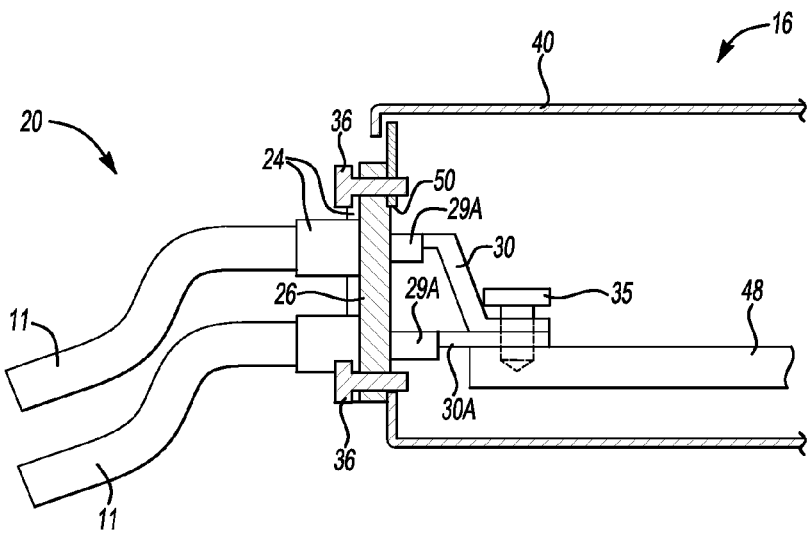
Fig-5
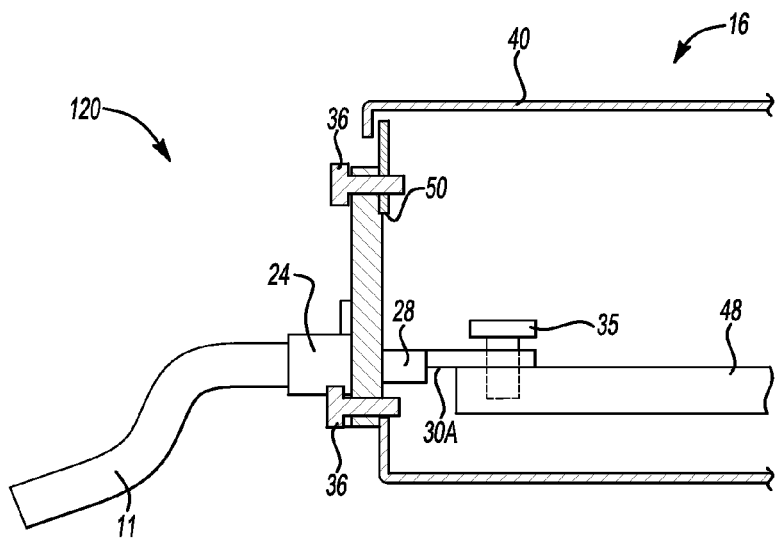
Fig-6

HIGH-VOLTAGE VEHICLE COMPONENT CONNECTION METHOD AND APPARATUS

TECHNICAL FIELD

The present invention relates to a method for electrically connecting or splicing a pair of high-voltage cables within a high-voltage vehicle component aboard a vehicle.

BACKGROUND OF THE INVENTION

In a high-voltage propelled vehicle (HVPV), such as a hybrid-electric vehicle (HEV), a plug-in hybrid electric vehicle (PHEV), a fuel cell electric vehicle (FCEV), or a purely electric vehicle (EV), a relatively high-voltage power supply or energy storage system (ESS), for example a battery pack or other electrochemical energy storage device, provides a source of at least a portion of the electrical power required for propelling the vehicle. An engine or fuel cell can shut off or selectively power down when the vehicle is idling or at a standstill in order to further conserve fuel, and/or the vehicle can run entirely on electrical power provided by the ESS, depending on the particular design of the vehicle.

To provide sufficient electrical power for partially or fully propelling the vehicle, as well as to energize various high-voltage components connected to the ESS aboard the vehicle, the ESS contains or stores a relatively high potential energy or voltage, typically on the order of 60 to 300 volts or more. Common high-voltage components used aboard an HVPV can include, for example, one or more electric motor/generators, as well as an air conditioning control module (ACCM), a power steering controller, a power inverter module (PIM), an auxiliary power module (APM), and/or other relatively high-voltage devices.

The ESS delivers electrical currents of approximately 75 to 100 amps or more, which are conducted, transmitted, or routed through a dedicated high-voltage circuit using a high-voltage bus having a positively charged rail and a negatively charged rail. A separate power distribution box (PDB), or alternately a PDB that is integrally constructed with one of the various high-voltage components, is ordinarily used to provide high-voltage power distribution functionality aboard the vehicle, as effective direct high-voltage cable splicing methods, such as are commonly used to splice low-voltage cables or wires such as within a 12V system aboard a vehicle, are generally impracticable. By integrating the PDB function and structure with that of one of the high-voltage components, the total number of components may be reduced. However, such an integrated component has additional complexity and limited interchangeability across different vehicle models and platforms.

Within the high-voltage component having PDB functionality, the electrical connection is ordinarily made using standard electrical cables and a bus bar having a relatively complex and geometrically offset configuration. Other high-voltage components receive dedicated power lines or cables from the high-voltage component having the integral PDB. While such designs provide certain advantages, they may be less than optimal for various manufacturing, cost-related, and packaging purposes.

SUMMARY OF THE INVENTION

Accordingly, a method is provided for splicing high-voltage electrical cables within a high-voltage component of a vehicle. An outer housing of each of the interconnected components provides both an environmental seal and an electromagnetic capability (EMC) shield protecting the splice. The method includes connecting a first electrical cable from a first high-voltage component to a high-voltage bus bar of a second high-voltage component.

When more than two components are used, the method includes connecting each of the components in series, using the outer housings of each component to provide the necessary environmental seals and EMC shielding of the splices contained within each of the outer housings. The connection to the bus bar is, in one embodiment, made using a ring terminal, which can be press-fitted or soldered to a conductor portion of the cable.

A high-voltage power distribution network for a vehicle includes an energy storage system (ESS), a first and a second high-voltage component each having an outer housing and a high-voltage bus bar positioned within the respective housing, and a pair of cables. A first cable connects the ESS to the bus bar of the first component, and a second cable connects the bus bar of the first component to the bus bar of the second component. Each of the outer housings provide an environmental seal and an EMC shield to the electrical connection or splice contained within. The high-voltage components can be, but are not limited to, a power inverter module (PIM), an air conditioning control module (ACCM), an auxiliary power module (APM), a power steering controller, and/or a motor/generator.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4A is a cross sectional side view of a representative high-voltage cable assembly usable with the power distribution network of FIG. 3;

FIG. 4B is a cross-sectional side view of a high-voltage cable usable with the power distribution network of FIG. 3 and the cable assemblies of FIGS. 4A, 5, and 6;

FIG. 5 is a cross-sectional side view of the high-voltage cable assembly shown in FIG. 4 when connected to a high-voltage vehicle component; and FIG. 6 is cross-sectional side view of another embodiment of the high-voltage cable assembly shown in FIG. 5.

DESCRIPTION OF THE PREFERRED EMBODIMENTS

Figure 1:
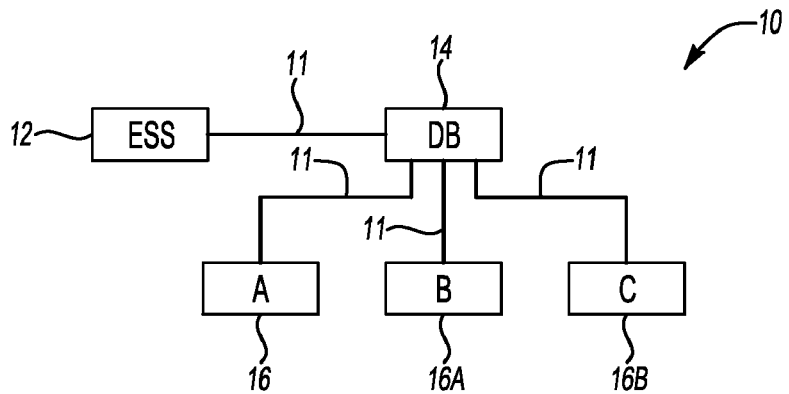
FIG. 1 is a schematic illustration of a prior art power distribution network aboard a vehicle.

Referring to the drawings, wherein like reference numbers refer to like components, and beginning with the prior art FIG. 1, a representative power distribution network 10 is typically configured for supplying high-voltage electrical energy to various components 16, 16A, and/or 16B aboard a vehicle (not shown) using a dedicated power distribution box (DB) 14, as described above. The network 10 includes an energy storage system (ESS) 12 which is electrically connected to the components 16, 16A, and 16B (also labeled A, B, and C, respectively) via suitable lengths of high-voltage cable 11 (see FIG. 4B).

The ESS 12 can be configured as one or more batteries, such as nickel cadmium, lithium ion, or other suitable rechargeable battery device, although other electrical and/or electrochemical devices having the ability to alternately store and deliver electrical power to the components 16, 16A, and/ or 16B as needed may also be used within the scope of the invention. The ESS 12 can be sized based on the required functions which the ESS 12 is expected to energize or support, including any regenerative braking requirements or propulsion requirements. The ESS 12 supplies high-voltage electrical power of approximately 60 to 300 volts, or more, ordinarily as a direct current voltage (VDC), although those of ordinary skill in the art will recognize that an alternating current voltage (VAC) may also be used. The electrical current delivered within the network 10 is generally approximately 75 to 100 amps, although other amperages may be used within the scope of the invention depending on the particular design of the vehicle (not shown) and network 10.

In the exemplary prior art network 10 of FIG. 1, the distribution box 14 is a separate component, with a cable 11 from the ESS 12 being electrically connected to a high-voltage bus bar (not shown) positioned within the distribution box 14. Cables 11 then connect the distribution box 14 to each of the various components 16, 16A, and 16B separately. That is, each of the components 16, 16A, and 16B has a separate connection or input into the distribution box 14. Use of a dedicated distribution box 14 may be less than optimal for various operational and economic reasons. Therefore, in accordance with the present invention as shown in FIGS. 3-6 described below, the distribution box 14 shown in the prior art configuration of FIG. 1 can be eliminated by splicing the cables 11 within the components 16, 16A, and 16B, in order to achieve a simplified series or daisy-chain power distribution configuration (see FIG. 3), and to therefore provide a more optimally distributed electrical power within the vehicle (not shown).

Figure 2:
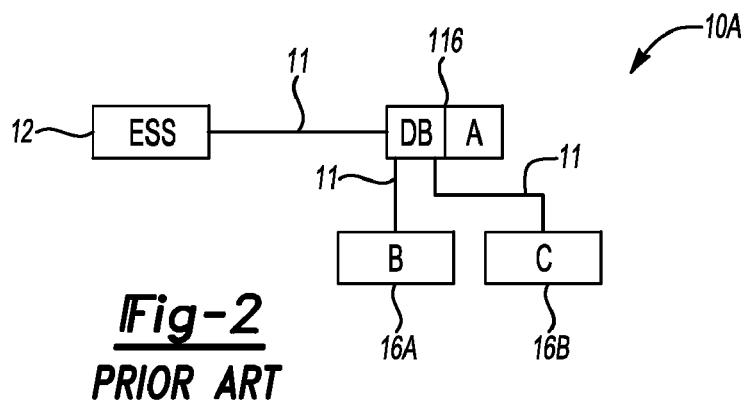
FIG. 2 is a schematic illustration of another prior art power distribution network.

The high-voltage component 16, or component A, is typically configured as a power inverter module or PIM, which is operable for receiving DC voltage from the ESS 12 and for providing AC current to one or more motor/generators, which could be either or both of the components 16A and/or 16B (component B and C, respectively) in FIG. 2. The component 16 can also be configured to include motor control logic needed to control the motor/generators, if either of the components 16A and 16B is so configured. When configured as an electrical motor, the components 16A or 16B can draw electrical energy from the ESS 12, and when operating as an electrical generator, the components 16A or 16B can generate electrical energy for storage within the ESS 12.

Referring to FIG. 2, a representative network 10A shows another prior-art configuration in which the distribution box 14 combines with one of the components 16, 16A, or 16B, into a common or integrated distribution/component 116. Cables 11 leading from the common distribution/component 116 feed into each of the components 16A and/or 16B separately, or additional high-voltage components (not shown), as needed. However, the respective configurations of FIGS. 1 and 2 include a distribution box 14 (FIG. 1) or a common distribution/component 116 (FIG. 2), which still requires separate connections to each of the components 16A, 16B connected thereto. As will now be explained with reference to the remaining figures, the distribution box 14 or common distribution/component 116 can be eliminated using a daisy-chain configuration enabled by the present invention, as will now be explained with reference to FIG. 3.

Figure 3:
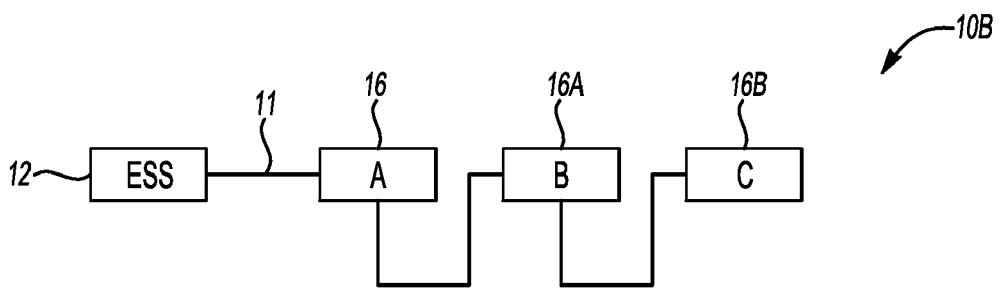
FIG. 3 is a schematic illustration of a series or daisy-chained power distribution network in accordance with the invention.

Referring to FIG. 3, and in accordance with the invention, a network 10B is provided in which the components 16, 16A, and/or 16B each have a single inlet port and a single outlet port are connected in series or "daisy-chained" using various lengths of the cables 11. In this manner, the housings 40 (see FIGS. 5 and 6) of the various components provide the environmental or weather seal as well as the electromagnetic compatibility (EMC) shield required for protecting the high-voltage electrical connection or splice within each of the housings 40, as will now be described with reference to FIGS. 4A through 6.

Referring to FIG. 4A, a wiring harness or an electrical cable assembly 20 has a pair of cables 11. As shown in FIG. 4B, each cable 11 contains a conductive wire or stranded wires, referred to hereinafter simply as the conductor 28, which is enclosed or contained within a dielectric inner insulating coating or insulator 29B, such as polyethylene, rubber, fluorocarbon, or another suitable dielectric or insulating material. A jacket or shield 27, such as woven nylon or other suitable material, is disposed between the insulator 29B and an outer insulator 29A. In FIG. 4A, one of the cables 11 can be an inlet cable routed from the ESS 12 (see FIGS. 1, 2, and 3) or from another of the high-voltage components 16, 16A, or 16B, while the other cable 11 can be an outlet cable routed in series to a different one of the components 16, 16A, or 16B (see FIG. 3).

Each of the cables 11 contains a conductor 28, as explained above with reference to FIG. 4A, with the shield 27 and the conductor 28 being inserted through an opening 41 formed or otherwise provided in a shield plate 26. The shield plate 26 is constructed of aluminum or another suitable material. Each of the wires 28 are connected to a respective one of a pair of terminals 30 and 30A, such as ring terminals or other electrical terminals, depending on the position of the cable 11 to which the wire is connected. The terminals 30, 30A, which can be a single stamped piece of tin-plated steel or other suitable material shaped, sized, or otherwise configured as needed depending on the number of cables 11 connected thereto, connect to a high-voltage bus bar 48 (see FIGS. 5 and 6) within the component 16 (see FIGS. 5 and 6), as will be discussed below with reference to FIGS. 5 and 6.

Referring to FIG. 5, the shield plate 26 of the cable assembly 20 is constructed of aluminum or other suitable material providing sufficient electromagnetic compatibility (EMC) shielding capability to the component 16. The shield plate 26 is shaped and/or sized as needed depending on the size of an opening 50 formed or provided in a housing 40 of the component 16. The housing 40 can be constructed of a rigid but lightweight material such as cast aluminum, with the shield plate 26 being rigidly or positively connected to the housing 40 to thereby cover the opening 50. In this manner, the shield plate 26 provides an additional or supplemental environmental seal to the component 16 by sealing the opening 50, with the housing 40 (see FIGS. 5 and 6) providing the main environmental sealing and EMC shielding required for the electrical splice or connection within the housing 40. The shield plate 26 can be connected to the housing using any suitable device or method, such as by using threaded fasteners 36 in the embodiment shown in FIG. 5.

An adaptor 24, such as metal, copper, or aluminum, circumscribes the shield 27 (see FIG. 4B) and is positioned adjacent to the shield plate 26 to further provide a sufficient environmental seal between the shield 27 and the shield plate 26. The terminals 30 and/or 30A, which can be a single part or a single terminal 30 as shown in FIG. 6, are directly connected to the conductors 28, such as by using a press-fit and/or a soldering process, or other suitable method, that ensures sufficient electrical conductivity, strength, and durability of the electrical connection. To further retain the cables 11 to the shield plate 26 prior to installation or connection to a component 16, a metal boss (not shown) may be used on one side of the shield plate 26, which can be squeezed or compressed against the cables 11 to connect or retain a perimeter or circumference of the cables 11 and hold the cables 11 in place. Alternately, plastic or adhesive (not shown) may be used between the cables 11 and the shield plate 26, or heat-shrink tubing (not shown) may be used, in order to ensure that the cable assembly 20 remains intact as a single assembly or part number during transit, as well as during the vehicle manufacturing process. Once so attached, the terminals 30, 30A are electrically connected to the bus bar 48 using a screw, bolt, or other fastener 35.

Referring to FIG. 6, an embodiment of the cable assembly 20 of FIGS. 4 and 5 is shown as a cable assembly 120, with the cable assembly 120 providing an end of the daisy-chain configuration shown in FIG. 3. A single terminal 30A is used to connect the cable 11 to the bus bar 48 as described above. Such a configuration might be used when, for example, the ESS 12 (see FIGS. 1, 2, and 3) is connected to a single component 16, which is not then electrically connected with another component 16A or 16B (see FIG. 3), or when the component 16 is the last component in a series of interconnected or spliced components.

In accordance with the description set forth hereinabove, and referring to FIGS. 3-6, a method is provided for forming an electrical splice between a first high-voltage component, such as a high-voltage energy storage system (ESS) or one of the various high-voltage components 16, 16A, or 16B discussed above, and a bus bar 48 positioned within each of the components 16, 16A, and 16B. To provide such a splice, a first end of a cable 11 is connected to the ESS 12 (see FIG. 1), and then the other end of the cable 11 is inserted or passed through the opening 50 (see FIGS. 5 and 6) of the housing 40. The cable 11 is then electrically connected to the bus bar 48 within the housing 40, and the shield plate 26 is connected to the housing 50, thus closing out the opening 50. The housing 40, and to a lesser extent the shield plate 26, provide the required environmental and EMC shielding capability for the splice. As discussed above, a terminal 30A (see FIG. 6) or 30A, 30B (see FIGS. 4A and 5) can be used to connect the cable 11 to the bus bar 48.

In this manner, some level of design complexity is transferred to the cable harness or cable assembly 20 from the relatively expensive high-voltage components 16, 16A, and 16B. Doing so potentially increases the opportunity to reuse the components 16, 16A, and/or 16B across different vehicle platforms without having to redesign any major components. Additionally, by transferring the complexity of the electrical connection from the bus bar 48 located within the component 16 to the cable assembly 20, any required clearance within the housing 40 is thereby reduced, thus saving valuable packaging space. The transfer of complexity to the cable assembly 20 is not expected to pose a significant obstacle in terms of additional pieces or required part numbers, as at least some features of the cabling used within various vehicles, such as length of the cables 11, is frequently different across the different vehicle platforms, thus already requiring unique part numbering.

While the best modes for carrying out the invention have been described in detail, those familiar with the art to which this invention relates will recognize various alternative designs and embodiments for practicing the invention within the scope of the appended claims.

The invention claimed is:

1. A method for providing an electrical splice between a first and a second high-voltage component within a vehicle, the method comprising:
    connecting a first end of a first electrical cable to a first high-voltage component;
    connecting a second end of the first electrical cable to a high-voltage bus bar positioned within an outer housing of the second high-voltage component to thereby form a first electrical splice; and
    using the outer housing to provide an environmental seal and an electromagnetic capability (EMC) shield for the first electrical splice.

2. The method of claim 1, further comprising connecting a first end of a second cable to the high-voltage bus bar of the second high-voltage component;
    connecting a second end of the second electrical cable to a high-voltage bus bar positioned within an outer housing of a third high-voltage component to thereby form a second electrical splice; and
        using the outer housing of the third high-voltage component to provide an environmental seal and an electromagnetic capability (EMC) shield for the second electrical splice.

3. The method of claim 1, wherein connecting the second end of the first cable to the high-voltage bus bar includes connecting a ring terminal to the second end of the first cable, and then connecting the ring terminal to the high-voltage bus bar.

4. The method of claim 2, wherein connecting a ring terminal to the second end of the first cable is conducted via one of a press-fitting process and a soldering process.

5. The method of claim 1, further comprising:
    passing the second end of the first cable through an adaptor; and
    connecting the adaptor to the outer housing of the first high-voltage component.

6. A method for splicing a first and a second high-voltage component in series within a high-voltage propelled vehicle (HVPV), each of the first and second high-voltage components being electrically connected to a high-voltage energy storage system (ESS), the method comprising:
    connecting a first end of a first high-voltage cable to the ESS;
    connecting a second end of the first high-voltage cable to a high-voltage bus bar contained within an outer housing of the first high-voltage component;
    connecting a first end of a second high-voltage cable to the bus bar contained within the outer housing of the first high-voltage component to form a first high-voltage splice; and
    connecting a second end of the second high-voltage cable to a bus bar contained within an outer housing of the second high-voltage component to form a second high-voltage splice;
    using the outer housing of the first high-voltage component to provide an environmental seal and an electromagnetic capability (EMC) shield for the first high-voltage splice; and
    using the outer housing of the first high-voltage component to provide a primary environmental seal and a primary electromagnetic capability (EMC) shield for the second high-voltage splice.

7. The method of claim 6, further comprising connecting a shield plate to an external surface of at least one of the first and the second outer housings to thereby form a secondary environmental seal and a secondary EMC shield for at least one of the first and the second high-voltage splice.

8. The method of claim 6, wherein at least one of the first and the second high-voltage component is configured as one of a high-voltage energy storage system (ESS), a power inverter module (PIM), an air conditioning control module (ACCM), an auxiliary power module (APM), a power steering controller, and an electrical motor/generator.

9. The method of claim 6, wherein at least one of connecting a first end of the first high-voltage cable and connecting a second end of the second high-voltage cable includes connecting a ring terminal to the respective first end and second end.

10. The method of claim 9, wherein connecting a ring terminal is selected from the group consisting of press-fitting and soldering 11. A high-voltage power distribution network for a vehicle, the network comprising:
   an energy storage system (ESS);
   a first and a second cable;
   a first high-voltage component having a first outer housing and a first high-voltage bus bar, the high-voltage bus bar being electrically connected to the ESS via the first cable;
   a second high-voltage component connected in series with the first high-voltage component, and having a second outer housing and a second high-voltage bus bar, the second high-voltage bus bar being electrically connected to the first high-voltage bus bar via the second cable;
   wherein the first and the second outer housings each provide an environmental seal and an electromagnetic compatibility (EMC) shield to the respective electrical connection therein.

12. The network of claim 11, further comprising a first and a second ring terminal, wherein the first ring terminal connects a conductor of the first cable to the high-voltage bus bar inside of the first outer housing, and
   wherein the second ring terminal connects a conductor of the second cable to the high-voltage bus bar inside of the second outer housing.

13. The network of claim 12, further comprising a pair of adaptors and a pair of shield plates;
   wherein each of the pair of adaptors circumscribes a different one of the first and the second cables, and for connecting the different one of the first and the second cables to a different one of the pair of shield plates; and
   wherein each of the pair of shield plates is adapted for sealing an opening in a different one of the first and the second outer housings.

14. The network of claim 11, wherein at least one of the first and the second high-voltage components is one of a power inverter module (PIM), an air conditioning control module (ACCM), an auxiliary power module (APM), a power steering controller, and a motor/generator.

* * * * *